(12) United States Patent  
Yoshida

(10) Patent No.: US 9,951,844 B2  
(45) Date of Patent: Apr. 24, 2018

(54) FRICTION TRANSMISSION BELT AND METHOD FOR FABRICATING SAME, AND BELT TRANSMISSION SYSTEM

(71) Applicant: BANDO CHEMICAL INDUSTRIES, LTD., Kobe-shi (JP)

(72) Inventor: Keisuke Yoshida, Kobe (JP)

(73) Assignee: Bando Chemical Industries, Ltd., Kobe-shi, Hyogo (JP)

( * ) Notice: Subject to any disclaimer, the term of this patent is extended or adjusted under 35 U.S.C. 154(b) by 861 days.

(21) Appl. No.: 14/327,436

(22) Filed: Jul. 9, 2014

(65) Prior Publication Data

US 2014/0323256 A1 Oct. 30, 2014

Related U.S. Application Data

(63) Continuation of application No. PCT/JP2012/008273, filed on Dec. 25, 2012.

(30) Foreign Application Priority Data

Jan. 11, 2012 (JP) ................................. 2012-002788

(51) Int. Cl.
*F16G 5/14* (2006.01)
*B29D 29/10* (2006.01)
(Continued)

(52) U.S. Cl.
CPC ............... *F16G 5/14* (2013.01); *B29D 29/10* (2013.01); *B29D 29/103* (2013.01); *F16G 5/06* (2013.01); *F16G 5/20* (2013.01)

(58) Field of Classification Search
CPC ......... B29D 29/10; B29D 29/103; F16G 5/06; F16G 5/14; F16G 5/20
See application file for complete search history.

(56) References Cited

U.S. PATENT DOCUMENTS 4,892,510 A * 1/1990 Matsuoka ................. F16G 5/20  
156/138  
6,296,588 B1 * 10/2001 Ciemniecki ............ B29D 29/08  
474/268

(Continued)

FOREIGN PATENT DOCUMENTS

| CN | 101802441 A | 8/2010 |
| JP | 2002-5238 A | 1/2002 |

(Continued)

*Primary Examiner* — William E Dondero  
*Assistant Examiner* — Mark K Buse  
(74) *Attorney, Agent, or Firm* — Knobbe, Martens, Olson & Bear, LLP

(57) ABSTRACT

A friction transmission belt has a belt body made of a rubber composition and wrapped around pulleys to transmit power. The belt includes a thermoplastic resin film provided to coat a pulley contact surface of the belt body, and a powder layer comprised of reduced friction coefficient powder particles provided on a surface side of the thermoplastic resin film. The powder layer includes powder particles buried in the thermoplastic resin film, powder particles carried and exposed on the surface of the thermoplastic resin film, and powder particles agglomerated and adhering to the powder particles carried and exposed on the surface of the thermoplastic resin film.

18 Claims, 13 Drawing Sheets

(51) Int. Cl.
*F16G 5/06* (2006.01)
*F16G 5/20* (2006.01)

(56) References Cited

U.S. PATENT DOCUMENTS

| | | | | |
|---|---|---|---|---|
| 6,409,621 | B1* | 6/2002 | Billups | F16G 1/08 |
| | | | | 474/260 |
| 6,443,866 | B1* | 9/2002 | Billups | F16G 5/20 |
| | | | | 474/260 |
| 7,137,918 | B2* | 11/2006 | Nonnast | F16G 5/20 |
| | | | | 156/137 |
| 9,303,722 | B2* | 4/2016 | Yoshida | F16G 5/08 |
| 2002/0187869 | A1* | 12/2002 | Martin | B29D 29/08 |
| | | | | 474/260 |
| 2004/0214675 | A1* | 10/2004 | Beck | F16G 1/08 |
| | | | | 474/260 |
| 2008/0207371 | A1* | 8/2008 | Dieudonne | F16G 5/20 |
| | | | | 474/263 |
| 2010/0075793 | A1 | 3/2010 | Cretin et al. | |
| 2010/0203994 | A1 | 8/2010 | Fujikawa et al. | |
| 2011/0237374 | A1* | 9/2011 | Nakao | C08K 5/098 |
| | | | | 474/205 |
| 2011/0269589 | A1* | 11/2011 | Schleicher | F16G 1/28 |
| | | | | 474/205 |
| 2012/0058849 | A1* | 3/2012 | Yoshida | B29D 29/103 |
| | | | | 474/148 |
| 2014/0378255 | A1* | 12/2014 | Gibson | F16G 1/08 |
| | | | | 474/263 |

FOREIGN PATENT DOCUMENTS

| | | |
|---|---|---|
| JP | 2002-122187 A | 4/2002 |
| JP | 2007-070592 A | 3/2007 |
| JP | 2007-170587 A | 7/2007 |
| JP | 2009-36302 A | 2/2009 |
| JP | 2009-533606 A | 9/2009 |
| JP | 2010-101489 A | 5/2010 |
| JP | 2011-190916 A | 9/2011 |

* cited by examiner

FRICTION TRANSMISSION BELT AND METHOD FOR FABRICATING SAME, AND BELT TRANSMISSION SYSTEM

CROSS-REFERENCE TO RELATED APPLICATIONS

This is a continuation of International Application No. PCT/JP2012/008273 filed on Dec. 25, 2012, which claims priority to Japanese Patent Application No. 2012-002788 filed on Jan. 11, 2012. The entire disclosures of these applications are incorporated by reference herein.

BACKGROUND

The present disclosure relates to friction transmission belts and methods for fabricating the friction transmission belts, and belt transmission systems.

It is well known to use friction transmission belts, such as a V-ribbed belt and a V belt, as a means for transmitting rotational power of an engine and a motor. It is also well known that when the friction transmission belt gets wet during its running, a so-called stick-slip phenomenon occurs on a pulley, and that noise is caused by the stick-slip phenomenon. Various measures have been taken to reduce such noise.

For example, Japanese Translation of PCT International Application Publication No. 2009-533606 discloses a V-ribbed belt with its V-ribbed surface coated with a low molecular-weight polyethylene resin film which contains fluorine particles.

Japanese Unexamined Patent Publication No. 2010-101489 discloses a V-ribbed belt in which a V-ribbed surface coated with a cover such as woven fabric is covered with a barrier layer made of a thermoplastic material, and at least the cover on a flank is partially incorporated in part of the thickness of the barrier layer.

Japanese Unexamined Patent Publication No. 2002-122187 discloses a V-ribbed belt in which a V-ribbed surface is coated with woven fabric, etc., and a thermoplastic resin layer is provided between a belt body and the woven fabric.

SUMMARY

The present disclosure is directed to a friction transmission belt which has a belt body made of a rubber composition and wrapped around pulleys to transmit power, the friction transmission belt including: a thermoplastic resin film provided to coat a pulley contact surface of the belt body; and a powder layer made of reduced friction coefficient powder particles provided on a surface side of the thermoplastic resin film.

The powder layer includes reduced friction coefficient powder particles buried in the thermoplastic resin film, reduced friction coefficient powder particles carried and exposed on the surface of the thermoplastic resin film, and reduced friction coefficient powder particles agglomerated and adhering to the reduced friction coefficient powder particles carried and exposed on the surface of the thermoplastic resin film.

The present disclosure is directed to a friction transmission belt which has a belt body made of a rubber composition and wrapped around pulleys to transmit power, wherein a powder layer is formed beforehand by spraying reduced friction coefficient powder particles on a molding surface of a belt forming mold on which a pulley contact side of the friction transmission belt is formed, a belt formation body comprised of an uncrosslinked rubber composition coated with a thermoplastic resin is pressure welded to the powder layer, and the uncrosslinked rubber composition is cross-linked at a molding temperature at which the reduced friction coefficient powder particles do not melt and at which the thermoplastic resin becomes soft or melts.

A belt transmission system of the present disclosure includes: the friction transmission belt of the present disclosure, and a plurality of pulleys around which the belt body of the friction transmission belt is wrapped.

A method for fabricating the friction transmission belt of the present disclosure is such that a powder layer is formed beforehand by spraying reduced friction coefficient powder particles on a molding surface of a belt forming mold on which a pulley contact side of the friction transmission belt is formed, a belt formation body comprised of an uncrosslinked rubber composition coated with a thermoplastic resin is pressure welded to the powder layer, and the uncrosslinked rubber composition is cross-linked at a molding temperature at which the reduced friction coefficient powder particles do not melt and at which the thermoplastic resin becomes soft or melts.

DETAILED DESCRIPTION

Embodiments will be described in detail below based on the drawings.

First Embodiment

Figure 1:
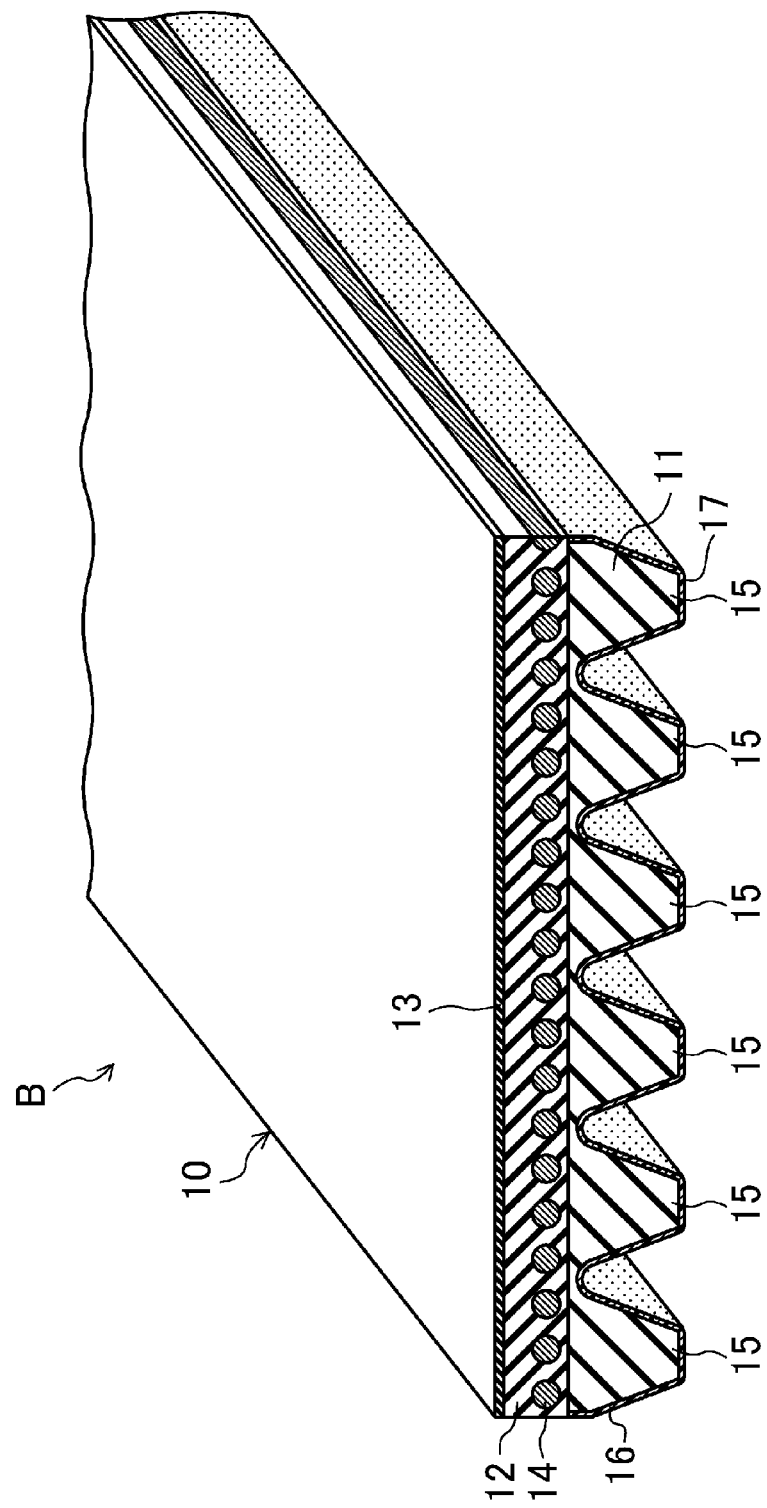
FIG. 1 is an oblique view of a V-ribbed belt of the first embodiment.
Figure 2:
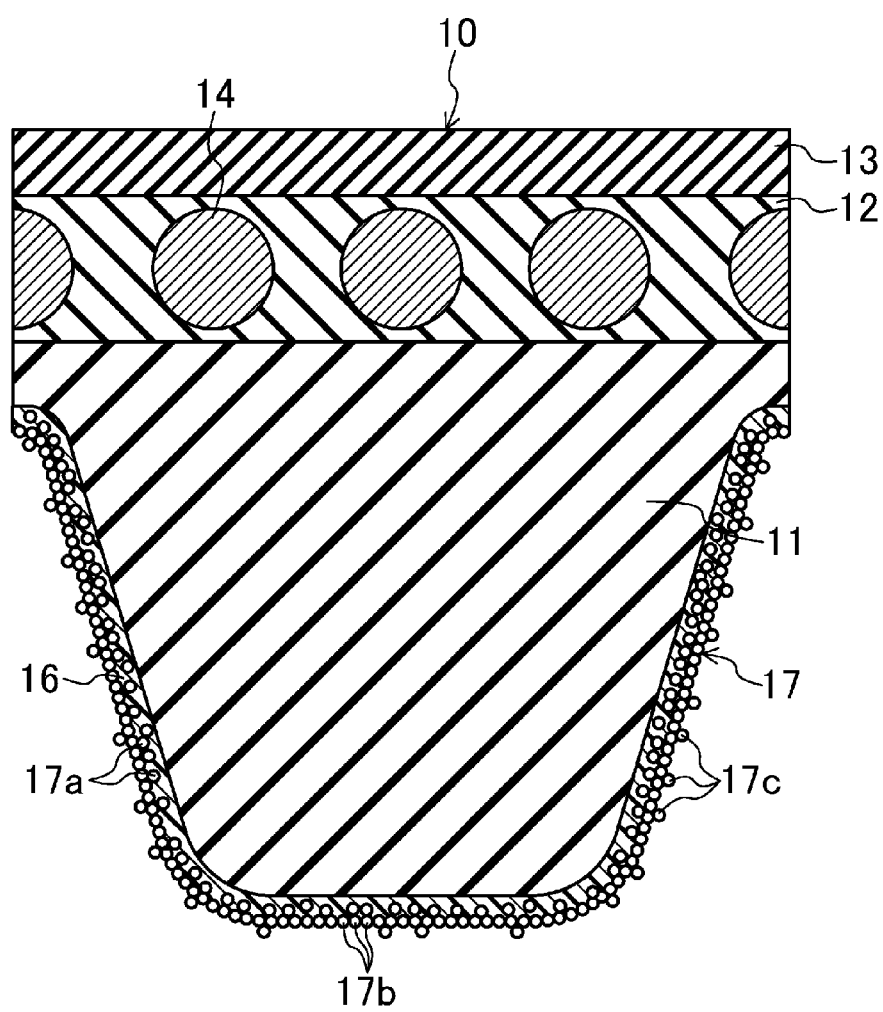
FIG. 2 is a cross-section of a main part of the V-ribbed belt of the first embodiment.

FIG. 1 and FIG. 2 show a V-ribbed belt B (a friction transmission belt) of the first embodiment. The V-ribbed belt B of the first embodiment is used, for example, in an accessory belt transmission system provided in an engine compartment of an automobile. The V-ribbed belt B of the first embodiment has a length of 700 to 3000 mm, a width of 10 to 36 mm, and a thickness of 4.0 to 5.0 mm, for example.

The V-ribbed belt B of the first embodiment includes a three-layer V-ribbed belt body 10 which includes a compression rubber layer 11 on an inner surface of the belt, an intermediate adhesion rubber layer 12, and a backside rubber layer 13 on an outer surface of the belt. Cord 14 arranged so as to form a helical pattern at a certain pitch in a width direction of the belt is embedded in the adhesion rubber layer 12.

The compression rubber layer 11 includes a plurality of V-shaped ribs 15 which protrude from the inner surface of the belt. Each of the plurality of V-shaped ribs 15 is in the shape of a rib extending in the longitudinal direction of the belt, and having a substantially inverted triangular cross-section. The V-shaped ribs 15 are aligned in the width direction of the belt. Each of the V-shaped ribs 15 has, for example, a height of 2.0 to 3.0 mm, and a width of 1.0 to 3.6 mm at a proximal end thereof. For example, the belt includes 3-6 ribs (6 ribs in FIG. 1). The compression rubber layer 11 is made of a rubber composition produced by heating and pressing an uncrosslinked rubber composition prepared by kneading a rubber component blended with various ingredients, and crosslinking the kneaded product by a crosslinker.

Examples of the rubber component of the rubber composition forming the compression rubber layer 11 include ethylene-α-olefin elastomer, chloroprene rubber (CR), chlorosulfonated polyethylene rubber (CSM), hydrogenated acrylonitrile-butadiene rubber (H-NBR), etc. The rubber component may be made of a single material, or a blend of two or more materials.

Examples of the ingredients include a reinforcing material such as carbon black, a vulcanization accelerator, a crosslinker, an antioxidant, a softener, etc.

Examples of the reinforcing material, especially carbon black, includes: channel black; furnace black such as SAF, ISAF, N-339, HAF, N-351, MAF, FEF, SRF, GPF, ECF, and N-234; thermal black such as FT and MT; and acetylene black. Silica may also be used as a reinforcing material. The reinforcing material may be made of a single material, or two or more materials. In order that resistance to wear and resistance to bending will be well balanced, 30 to 80 parts by mass of the reinforcing material is preferably blended into 100 parts by mass of the rubber component.

Examples of the vulcanization accelerator include metal oxides, such as magnesium oxide and zinc oxide (zinc white), metal carbonates, fatty acids, such as a stearic acid, and the derivatives thereof. The vulcanization accelerator may be made of a single material, or two or more materials. For example, 0.5 to 8 parts by mass of the vulcanization accelerator is blended into 100 parts by mass of the rubber component.

Examples of the crosslinker include sulfur and organic peroxide. Sulfur may be used as the crosslinker, or organic peroxide may be used as the crosslinker, or both of sulfur and organic peroxide may be used as the crosslinker. In the case of using sulfur as the crosslinker, it is preferable to blend 0.5 to 4.0 parts by mass of sulfur with respect to 100 parts by mass of the rubber component. In the case of using organic peroxide as the crosslinker, it is preferable to blend 0.5 to 8 parts by mass of organic peroxide with respect to 100 parts by mass of the rubber component.

Examples of the antioxidant includes amine-based agents, quinoline-based agents, hydroquinone derivatives, phenolic agents, phosphite-based agents. The antioxidant may be made of a single material, or two or more materials. For example, 0-8 parts by mass of the antioxidant is blended into 100 parts by mass of the rubber component.

Examples of the softener include: petroleum softeners; mineral oil-based softeners such as paraffin wax; and vegetable oil based-softeners such as castor oil, cottonseed oil, linseed oil, rapeseed oil, soybean oil, palm oil, coconut oil, peanut oil, Japan wax, rosin, and pine oil. The softener may be made of a single material, or two or more materials. For Example, 2 to 30 parts by mass of the softener, other than the petroleum softeners, is blended into 100 parts by mass of the rubber component.

A layered silicate such as a smectite group, a vermiculite group, or a kaolin group may be included as the ingredient.

Figure 3:
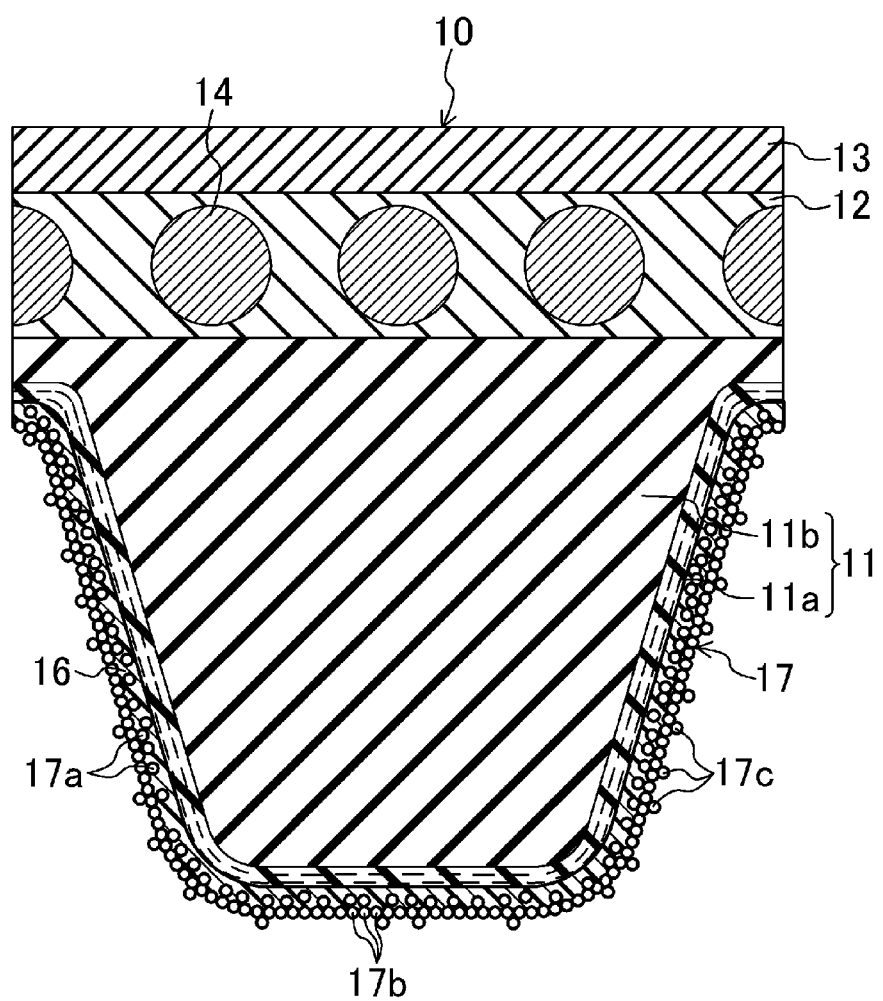
FIG. 3 is a cross-section of a main part of a V-ribbed belt of a variation of the first embodiment.

The compression rubber layer 11 may be made of a single rubber composition, or two or more layered rubber compositions. For example, as shown in FIG. 3, the compression rubber layer 11 may include a pulley contact side surface layer 11a containing a material that reduces a friction coefficient, and an inner rubber layer 11b on the inner side of the pulley contact side surface layer 11a. Examples of the material that reduces a friction coefficient include short fibers, such as nylon short fibers, vinylon short fibers, aramid short fibers, polyester short fibers, and cotton short fibers, and ultra high molecular weight polyethylene resins. It is preferable that the inner rubber layer 11b do not contain short fibers and the material that reduces the friction coefficient.

Surfaces of the V-shaped ribs 15 of the compression rubber layer 11, which are pulley contact surfaces, are coated with a thermoplastic resin film 16. The thickness of the thermoplastic resin film 16 is preferably 0.1 to 200 μm, more preferably 1.0 to 100 μm, and further preferably 10 to 50 μm.

Examples of the thermoplastic resin forming the thermoplastic resin film 16 include polyolefin resin such as polyethylene resin (PE) and polypropylene resin (PP), polystyrene resin (PS), polycarbonate resin (PC), acrylonitrile butadiene styrene resin (ABS). Among these resins, polyolefin resin such as polyethylene resin (PE) and polypropylene resin (PP) is preferable, and polyethylene resin (PE) is more preferable. The thermoplastic resin may be made of a single material, or may be a blend of two or more materials. The thermoplastic resin forming the thermoplastic resin film 16 may be a crystalline resin such as polyethylene resin (PE) and polypropylene resin (PP), or may be a non-crystalline resin such as polystyrene resin (PS). The softening temperature or the melting point of the thermoplastic resin forming the thermoplastic resin film 16 is preferably 100 to 170° C., and more preferably 130 to 160° C., in view of balance between molding processability and resistance to heat of the belt.

A powder layer 17 formed of reduced friction coefficient powder particles 17a, 17b, 17c is provided on the surface of the thermoplastic resin film 16.

The powder layer 17 may be provided such that the entire surface of the thermoplastic resin film 16 is coated, or may be provided such that the surface of the thermoplastic resin film 16 is partially coated, for example, such that the surface of the thermoplastic resin film 16 corresponding to only half circumference of the belt, or the surface of the thermoplastic resin film 16 corresponding to an inner or outer side of the belt in the belt width direction is coated. The powder layer 17 may be provided uniformly on the surface of the thermoplastic resin film 16, or may be provided nonuniformly on the surface of the thermoplastic resin film 16 such that an uneven pattern, for example, is formed.

Figure 4:
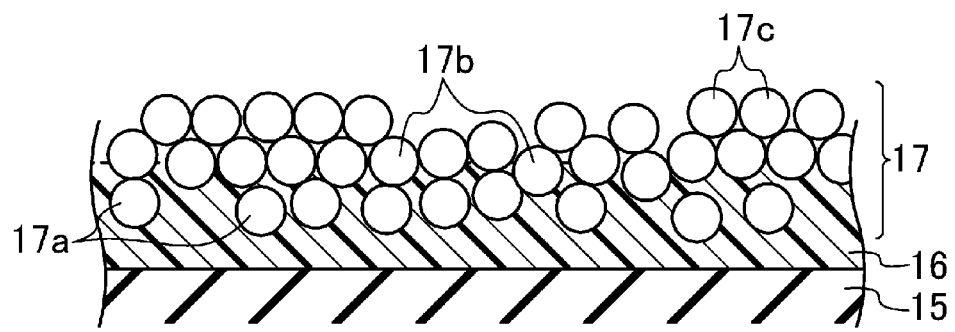
FIG. 4 is a cross-section of a V-ribbed surface layer of the V-ribbed belt of the first embodiment.

As shown in FIG. 4, the powder layer 17 includes reduced friction coefficient powder particles 17a buried in the thermoplastic resin film 16, reduced friction coefficient powder particles 17b carried and exposed on the surface of the thermoplastic resin film 16, and reduced friction coefficient powder particles 17c agglomerated and adhering to the reduced friction coefficient powder particles 17b carried and exposed on the surface of the thermoplastic resin film 16. The reduced friction coefficient powder particles 17b, 17c of the powder layer 17 provide fine irregularities in the surface of the V-shaped ribs 15.

The particle size of each of the reduced friction coefficient powder particles 17a, 17b, 17c is preferably 0.1 to 150 μm, more preferably 0.5 to 60 μm, and further preferably 5 to 20 μm. The term "particle size" used herein refers to a value represented by any of the mesh size of a test sieve as measured by a sieving method, the equivalent Stokes diameter as measured by a sedimentation method, the equivalent spherical diameter as measured by a light scattering method, and the equivalent spherical diameter as measured by an electrical resistance test method.

Examples of the materials forming the reduced friction coefficient powder particles 17a, 17b, 17c include fluorocarbon resin, layered silicate, talc, calcium carbonate, and silica. Among these materials, fluorocarbon resin is preferable in view of reducing a friction coefficient of the surface of the V-shaped rib 15 which is a pulley contact surface. Each of the reduced friction coefficient powder particles 17a, 17b, 17c may be made of a single material, or a blend of two or more materials.

Examples of the fluorocarbon resin include polytetrafluoroethylene (PTFE) resin, tetrafluoroethylene-perfluoro (alkyl vinyl ether) copolymer (PFA) resin, tetrafluoroethylene-hexafluoropropylene copolymer (FEP) resin, tetrafluoroethylene-ethylene copolymer (ETFE) resin, polyvinylidene fluoride (PVDF) resin, polychlorotrifluoroethylene (PCTFE) resin, and ethylene chlorotrifluoroethylene copolymer (ECTFE) resin. Among these, polytetrafluoroethylene (PTFE) resin is preferable. Specifically, for example, PTFE powder of TFW series (TFW-500, TFW-1000, TFW-2000, TFW-3000, TFW-3000F) produced by SEISHIN ENTERPRISE CO., LTD. may be used.

Examples of the layered silicate include smectite group, vermiculite group, and kaolin group. Examples of smectite group include montmorillonite, beidellite, saponite, hectorite. Examples of vermiculite group include trioctahedral vermiculite and dioctahedral vermiculite. Examples of kaolin group include kaolinite, dickite, halloysite, lizardite, amesite, chrysotile. Montmorillonite of the smectite group is preferable as the layered silicate.

In addition to the powder layer 17, short fibers may be adhered to the surface of the thermoplastic resin film 16 in order to increase resistance to wear. Examples of such short fibers include nylon short fibers, vinylon short fibers, aramid short fibers, polyester short fibers, and cotton short fibers. For example, the short fibers have a length of 0.2 to 5.0 mm, and a diameter of 10 to 50 μm.

The adhesion rubber layer 12 is in the shape of a strip having a horizontally elongated rectangular cross section, and has a thickness of 1.0 to 2.5 mm, for example. The backside rubber layer 13 is also in the shape of a strip having a horizontally elongated rectangular cross section, and has a thickness of 0.4 to 0.8 mm, for example. In order to reduce sound generated between the belt back surface and a flat pulley in contact with the belt back surface, the surface of the backside rubber layer 13 preferably has a weave pattern transferred from a woven fabric. Each of the adhesion rubber layer 12 and the backside rubber layer 13 is made of a rubber composition produced by heating and pressing an uncrosslinked rubber composition prepared by kneading a rubber component blended with various ingredients, and crosslinking the kneaded product by a crosslinker. In order to reduce adhesion between the belt back surface and the flat pulley in contact with the belt back surface, the backside rubber layer 13 is preferably made of a rubber composition which is slightly harder than the rubber composition of the adhesion rubber layer 12. The V-ribbed belt body 10 may be comprised of the compression rubber layer 11 and the adhesion rubber layer 12, and the backside rubber layer 13 may be replaced with a reinforcement fabric made, for example, of woven fabric, knitted fabric, or unwoven fabric made of fibers such as cotton, polyamide fibers, polyester fibers, and aramid fibers, etc.

Examples of the rubber components of the rubber compositions of the adhesion rubber layer 12 and the backside rubber layer 13 include ethylene-α-olefin elastomer, chloroprene rubber (CR), and chlorosulfonated polyethylene rubber (CSM), hydrogenated acrylonitrile-butadiene rubber (H-NBR). The rubber components of the adhesion rubber layer 12 and the backside rubber layer 13 are preferably the same as a rubber component of the compression rubber layer 11.

Like the compression rubber layer 11, examples of the ingredients include a reinforcing material such as carbon black, a vulcanization accelerator, a crosslinker, an antioxidant, and a softener.

The compression rubber layer 11, the adhesion rubber layer 12, and the backside rubber layer 13 may be made of different rubber compositions, or may be made of the same rubber composition.

The cord 14 is made of twist yarn such as polyester fibers (PET), polyethylene naphthalate fibers (PEN), aramid fibers, and vinylon fibers. To provide the cord 14 with adhesion properties to the V-ribbed belt body 10, the cord 14 is subjected to an adhesion treatment in which the cord material before being formed into the cord 14 is immersed in a resorcinol formaldehyde latex aqueous solution (hereinafter referred to as an "RFL aqueous solution") and thereafter heated and/or an adhesion treatment in which the cord 14 is immersed in rubber cement and thereafter dried.

Figure 5:
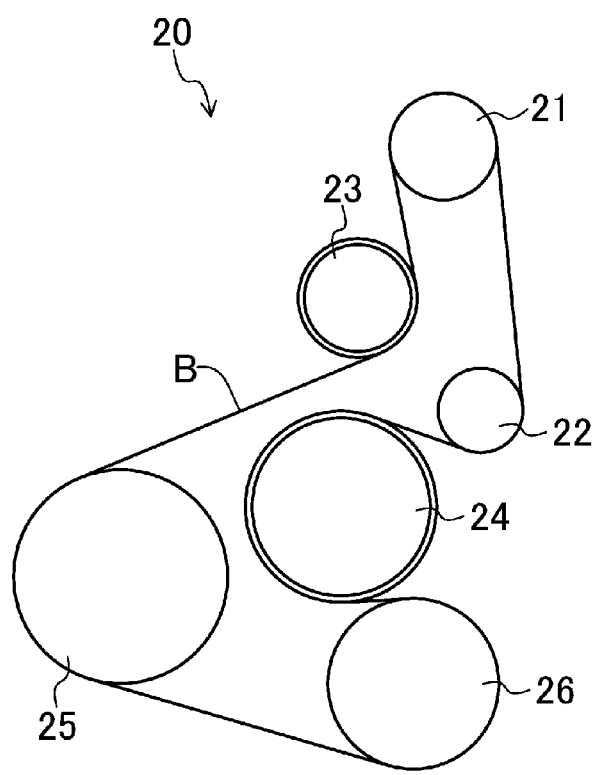
FIG. 5 shows a layout of pulleys of an accessory belt transmission system of an automobile using the V-ribbed belt of the first embodiment.

FIG. 5 shows an layout of pulleys of an accessory belt transmission system 20 of an automobile using the V-ribbed belt B of the first embodiment. The accessory drive belt transmission system 20 is of a serpentine drive type in which the V-ribbed belt B is wrapped around six pulleys, i.e., 4 ribbed pulleys and two flat pulleys, to transmit power.

The accessory belt transmission system 20 includes: a power steering pulley 21 located at an uppermost position; an AC generator pulley 22 placed at a location slightly lower left of the power steering pulley 21; a tensioner pulley 23, which is a flat pulley, located on a lower left side of the power steering pulley 21 and upper left side of the AC generator pulley 22; a water pump pulley 24, which is a flat pulley, located on a lower left side of the AC generator pulley 22 and directly under the tensioner pulley 23; a crankshaft pulley 25 located on a lower left side of the tensioner pulley 23 and of the water pump pulley 24; and an air-conditioner pulley 26 located on a lower right side of the water pump pulley 24 and of the crankshaft pulley 25. Among these pulleys, all the pulleys other than the tensioner pulley 23 and the water pump pulley 24, which are flat pulleys, are ribbed pulley. These ribbed pulleys and flat pulleys are made of pressed metals or castings, or resin moldings using nylon resin and phenol resin, for example, and have a pulley diameter of 50 to 150 mm.

In the accessory belt transmission system 20, the V-ribbed belt B is wrapped around the power steering pulley 21 such that the V-shaped ribs 15 come in contact with the power steering pulley 21, and thereafter wrapped around the tensioner pulley 23 such that the belt back surface comes in contact with the tensioner pulley 23. After that, the V-ribbed belt B is sequentially wrapped around the crankshaft pulley 25 and the air-conditioner pulley 26 such that the V-shaped ribs 15 come in contact with the crankshaft pulley 25 and the air-conditioner pulley 26, wrapped around the water pump pulley 24 such that the belt back surface comes in contact with the water pump pulley 24, wrapped around the AC generator pulley 22 such that the V-shaped ribs 15 come in contact with the AC generator pulley 22, and returns to the power steering pulley 21.

Now, an example method for fabricating the V-ribbed belt B of the first embodiment will be described, based on FIGS. 6 to 11.

Figure 6:
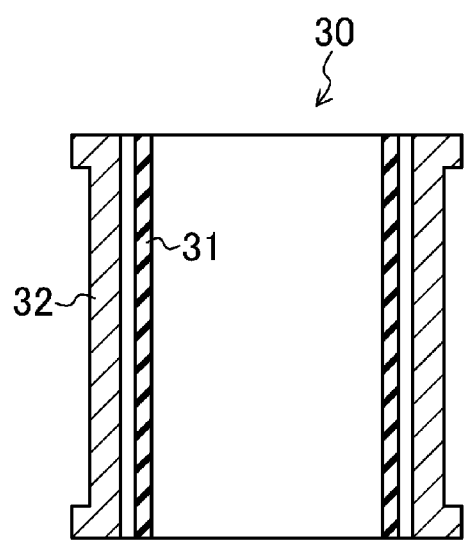
FIG. 6 is a vertical cross-section of a belt forming mold used in fabricating the V-ribbed belt of the first embodiment.
Figure 7:
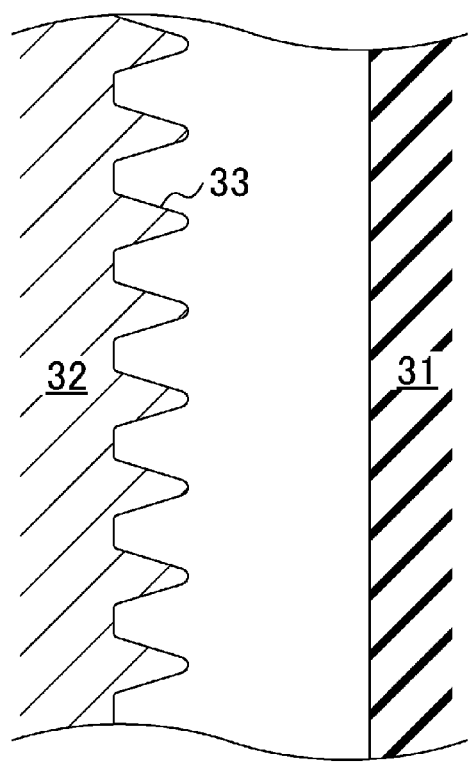
FIG. 7 is an enlarged vertical cross-section of part of the belt forming mold used in fabricating the V-ribbed belt of the first embodiment.

In fabricating the V-ribbed belt B of the first embodiment, a belt forming mold 30 comprised of a cylindrical inner mold 31 (rubber sleeve) and a cylindrical outer mold 32 which are concentric with each other as shown in FIG. 6 and FIG. 7, is used.

The inner mold 31 of the belt forming mold 30 is made of a flexible material such as rubber. The outer circumferential surface of the inner mold 31 serves as a molding surface, and a weave pattern of woven fabric, etc., is formed on the outer circumferential surface of the inner mold 31. The outer mold 32 is made of a rigid material such as a metal. The inner circumferential surface of the outer mold 32 serves as a molding surface, and V-shaped rib formation grooves 33 are formed in the inner circumferential surface of the outer mold 32 at regular intervals in an axial direction. The outer mold 32 is provided with a temperature control mechanism which allows a heating medium, such as water vapor, or a cooling medium, such as water, to flow and control temperature. The belt forming mold 30 is provided with a pressurizing means configured to pressurize and expand the inner mold 31 from inside.

In the fabrication of the V-ribbed belt B of the first embodiment, a rubber component is blended with ingredients and mixed by a mixer, such as a kneader and a Banbury mixer, and the obtained uncrosslinked rubber composition is shaped into a sheet using a calender, etc., thereby forming an uncrosslinked rubber sheet 11' for the compression rubber layer 11 (an uncrosslinked rubber composition for forming the belt). Uncrosslinked rubber sheets 12', 13' for the adhesion rubber layer 12 and the backside rubber layer 13 are formed in a similar manner. After adhesion treatment in which twist yarn 14' to be the cord 14 is immersed in an RFL aqueous solution and heated, adhesion treatment in which the twist yarn 14' is immersed in rubber cement and is heated and dried, is performed.

Figure 9:
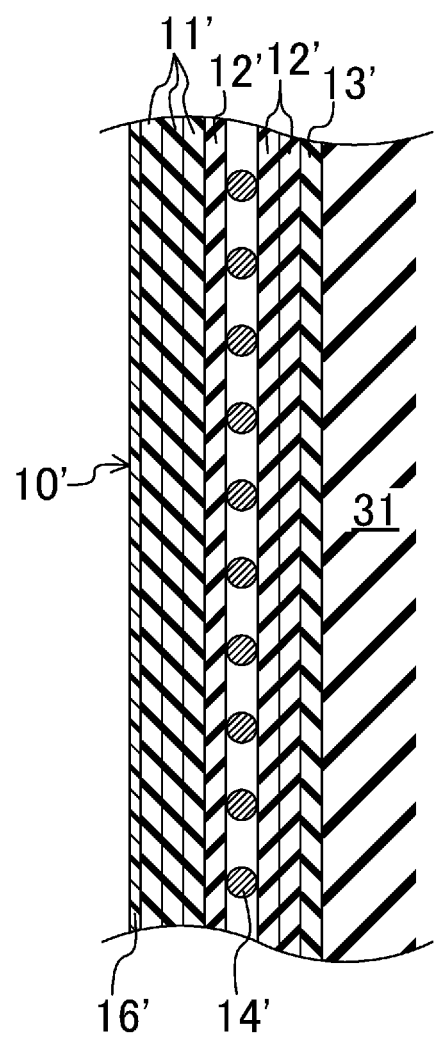
FIG. 9 is a drawing for explaining a step of placing an uncrosslinked rubber sheet, etc., on an inner mold in fabricating the V-ribbed belt of the first embodiment.

Next, as shown in FIG. 9, the uncrosslinked rubber sheet 13' for the backside rubber layer 13 and the uncrosslinked rubber sheet 12' for the adhesion rubber layer 12 are sequentially wrapped around and layered on the outer circumferential surface, i.e., the molding surface, of the inner mold 31. After that, the twist yarn 14' for the cord 14 is helically wrapped around the cylindrical inner mold 31, and the uncrosslinked rubber sheet 12' for the adhesion rubber layer 12 and the uncrosslinked rubber sheet 11' for the compression rubber layer 11 are sequentially wrapped around and layered on the surface. Lastly, a thermoplastic resin sheet 16' is wrapped around the outer surface as a coating, thereby forming a belt formation body 10'. In the case of forming the V-ribbed belt B having the configuration shown in FIG. 3, different rubber compositions are used for the pulley contact side surface layer 11a and the inner rubber layer 11b, as the uncrosslinked rubber sheet 11' for the compression rubber layer 11.

The ends of the thermoplastic resin sheet 16' wrapped around the uncrosslinked rubber sheet 11' for the compression rubber layer 11 may be connected by a lap joint or may be connected by a butt joint with almost no gap between the ends. In the case where the ends of the thermoplastic resin sheet 16' are connected by a butt joint, it is preferable to weld the ends of the thermoplastic resin sheet 16' by heat (thermal adhesion). In a subsequent vulcanization step, the thermoplastic resin sheet 16' shrinks and a gap is formed between the ends of the thermoplastic resin sheet 16' in the case where the ends are not adhered by a butt joint. However, in the case of PK V-ribbed belt B, a gap less than or equal to about 10 mm does not cause a problem such as generation of noise.

Instead of the wrapping of the thermoplastic resin sheet 16', a thermoplastic resin extruded as a cylindrical film may be placed on the uncrosslinked rubber sheet 11' of the compression rubber layer 11, or the ends of a thermoplastic resin sheet may be adhered together to form a cylindrical shape, and the cylindrical thermoplastic resin may be placed on the uncrosslinked rubber sheet 11' of the compression rubber layer 11. Thermal adhesion is preferable as the adhesion of the ends of the thermoplastic resin sheet.

The joint portion of the thermoplastic resin sheet 16' may extend in a direction orthogonal to the length direction of the V-ribbed belt B to be fabricated, or may extend so as to be inclined with respect to the belt length direction.

Figure 8:
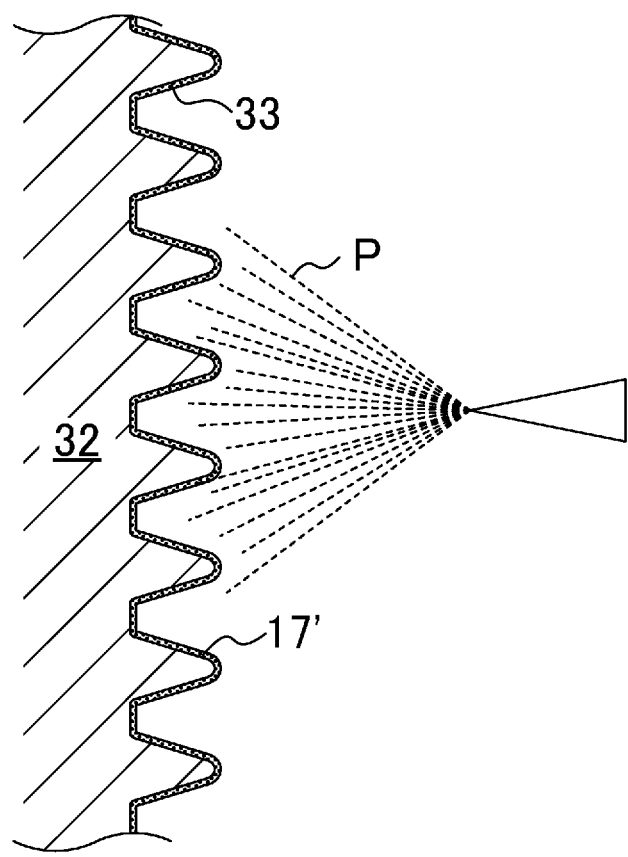
FIG. 8 is a drawing for explaining a step of spraying powder on an outer mold in fabricating the V-ribbed belt of the first embodiment.

On the other hand, as shown in FIG. 8, reduced friction coefficient powder particle P is splayed on the inner circumferential surface of the outer mold 32, which is a molding surface for forming a pulley contact side. A powder layer 17' is formed at this time on the molding surface of the outer mold 32. The thickness of the powder layer 17' is preferably 0.1 to 200 μm, and more preferably 1.0 to 100 μm. The powder layer 17 preferably cover the entire surface of the thermoplastic resin film 16. In such a case, the powder layer 17' needs to be provided on the entire molding surface of the outer mold 32. It is therefore preferable that the thickness of the powder layer 17' is at least greater than or equal to a particle size of the reduced friction coefficient powder particle P. Since the powder layer 17 includes the reduced friction coefficient powder particles 17a buried in the thermoplastic resin film 16 and the reduced friction coefficient powder particles 17*b* carried and exposed on the surface of the thermoplastic resin film 16, it is preferable that the reduced friction coefficient powder particle P is superimposed on the molding surface of the outer mold 32. In view of this point, the thickness of the powder layer 17' is preferably twice or more, and more preferably three times or more of a particle size of the reduced friction coefficient powder particle P. If the thickness of the powder layer 17' is thick, it means that a great amount of excess powders adheres, and they come off in the initial time of running. In view of this point, the thickness of the powder layer 17' is preferably ten times or less, and more preferably seven times or less of the particle size of the reduced friction coefficient powder particle P. Further, in order to increase adhesive properties to the outer mold 32, it is preferable that the reduced friction coefficient powder particle P to be sprayed is charged by applying a voltage of 10 to 100 kV, for example. The reduced friction coefficient powder particle P can be sprayed using a commonly-used powder coating device.

Figure 10:
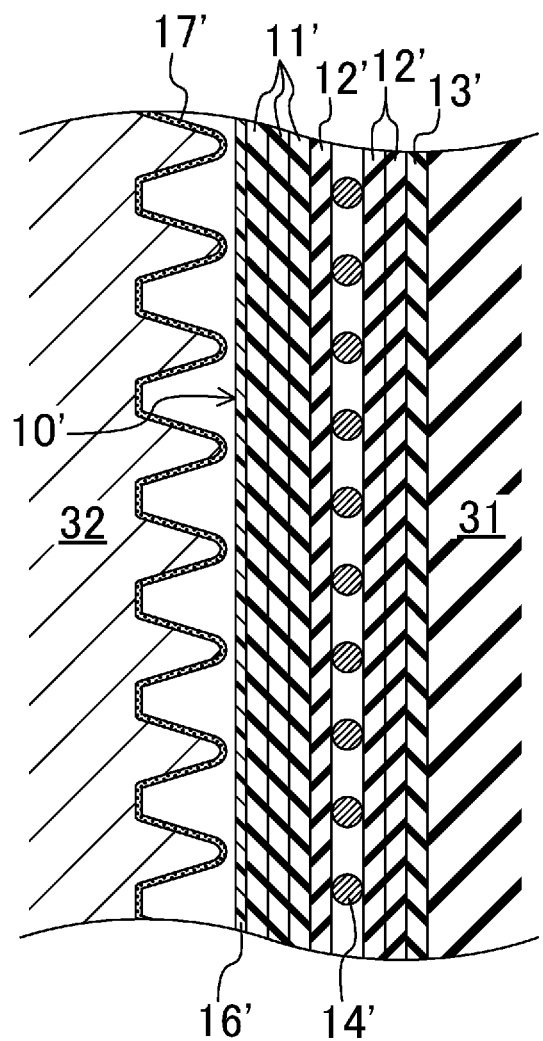
FIG. 10 is a drawing for explaining a step of positioning the inner mold inside the outer mold in fabricating the V-ribbed belt of the first embodiment.

Next, as shown in FIG. 10, the inner mold 31 is positioned in the outer mold 32 and is closed. The inner space of the inner mold 31 is sealed at this time.

Figure 11:
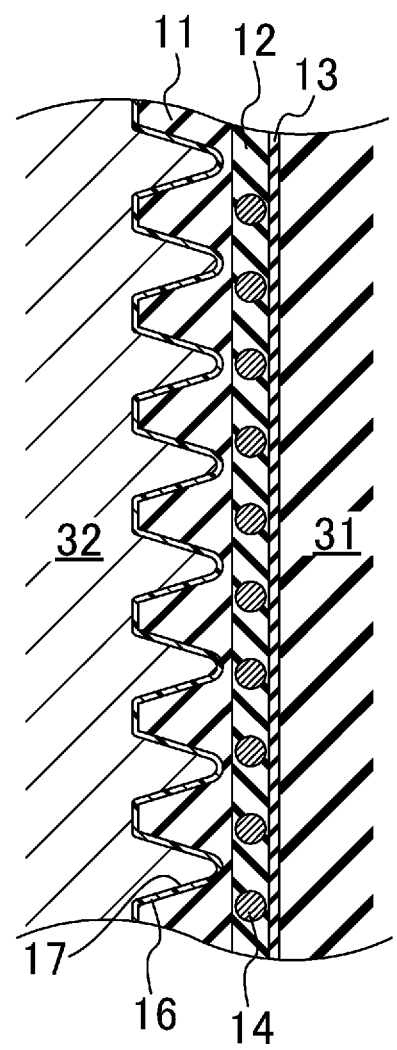
FIG. 11 is a drawing for explaining a step of molding a belt slab in fabricating the V-ribbed belt of the first embodiment.

Next, the outer mold 32 is heated to a molding temperature at which the reduced friction coefficient powder particle P does not melt and at which the thermoplastic resin sheet 16' becomes soft or melts. Further, high-pressure air, etc., is injected in the sealed inner space of the inner mold 31 to apply pressure. As shown in FIG. 11, the inner mold 31 expands at this moment, and the belt formation body 10' is pressure welded to the molding surface of the outer mold 32. Cross-linking of the uncrosslinked rubber sheets 11', 12', 13' proceeds, and the rubber sheets 11', 12', 13' are integrated and combined with the twist yarn 14'. Further, the thermoplastic resin sheet 16' becomes soft or melts to combine with rubber, and the cylindrical belt slab is eventually formed. Further, the powder layer 17' formed beforehand by spraying the reduced friction coefficient powder particle P on the molding surface of the outer mold 32 is combined with the surface of the thermoplastic resin sheet 16' which has become soft or melted. The molding temperature of the belt slab is 100 to 180° C., for example. The molding pressure is 0.5 to 2.0 MPa, for example. The molding time is 10 to 60 minutes, for example.

Next, the pressure of the inner space of the inner mold 31 is reduced to remove the sealing, and the belt slab formed between the inner mold 31 and the outer mold 32 is removed. The belt slab is cut into rings having a predetermined width, turned inside out, thereby obtaining the V-ribbed belt B.

Here, a technique in which a thermoplastic resin film is provided to coat a V-ribbed surface of a V-ribbed belt, and a friction coefficient reduction filler and a filler for improving resistance to wear are mixed in the thermoplastic resin film has been known. The thermoplastic resin film has been expected to reduce noise caused by stick-slip due to friction reduction effect of the friction coefficient reduction filler, and improve the resistance to wear due to reinforcement effect of the filler for improving resistance to wear.

Figure 12A:
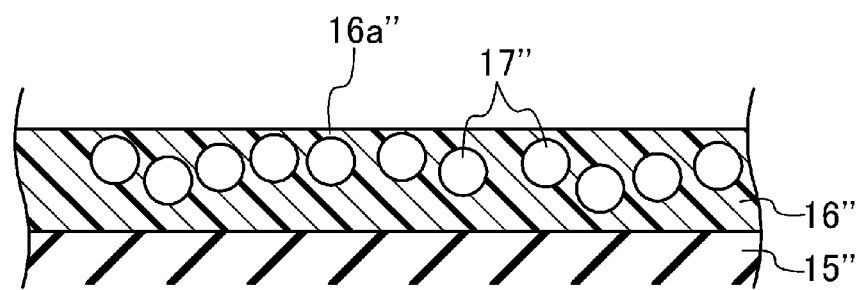
FIG. 12A is a cross-section of a V-ribbed surface layer of a V-ribbed belt of the first conventional example.

However, in fabricating the above conventional V-ribbed belt, the rubber surface before vulcanization molding is coated with thermoplastic resin, and the friction coefficient reduction filler is sprayed on the surface thereafter. Therefore, the thermoplastic resin flows during the vulcanization molding, while being plastically deformed. As a result, in the above conventional V-ribbed belt, the friction coefficient reduction filler 17" is buried in the thermoplastic resin film 16" as shown in FIG. 12A, and a skin layer 16*a"* of the thermoplastic resin film 16" is formed on the surface of the V-shaped rib 15". This means that the friction reduction effect of the friction coefficient reduction filler 17" is not as much as it has been expected. In fact, it is acknowledged that when the conventional V-ribbed belt is applied to an accessory belt transmission system of an automobile under severe conditions, noise is generated by stick-slip from the initial time of running. Further, particularly in recent years, accessory belt transmission systems of automobiles include a crank pulley to which a water-based paint, which increases a friction coefficient, is applied. Thus, it is becoming very important to reduce the friction coefficient at the initial time of running, and in that case, the above conventional V-ribbed belt cannot sufficiently reduce the friction coefficient at all. Moreover, in the conventional V-ribbed belt, the skin layer of the thermoplastic resin film makes the V-ribbed surface very smooth. Therefore, when the belt gets wet, a film of water is easily formed on the V-ribbed surface, and the belt slip occurs due to a hydroplaning phenomenon. This means that power transmission itself cannot be achieved.

Figure 12B:
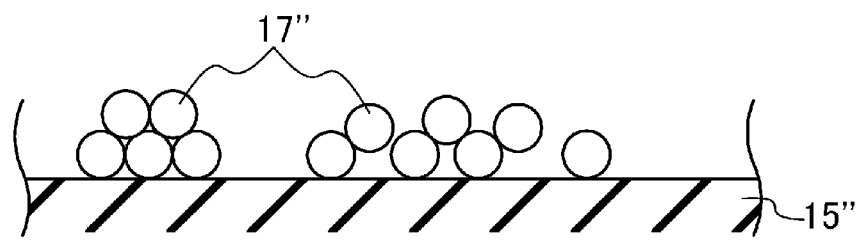
FIG. 12B is a cross-section of a V-ribbed surface layer of the second conventional example.

To solve these problems, a technique has been adopted in which an initial friction coefficient is reduced to prevent noise caused by stick-slip by spraying power, such as baby powder, onto the V-ribbed surface after vulcanization molding. However, although it is indeed possible to reduce the friction coefficient in the initial time of running and reduce noise, the powder particles 17" are released in a short time after the start of running because the powder particles 17" merely adhere to the surface of the V-shaped rib 15" as shown in FIG. 12B. Therefore, the friction coefficient reduction effect is lost and noise is generated due to stick-slip. Moreover, since the effect of preventing the hydroplaning phenomenon due to irregularities of the powder particles is also lost at the same time, belt slip may occur when the belt gets wet. In particular, if the belt gets wet due to heavy rain, for example, in the initial time of running, the powder particles are washed away in several minutes, which may lead to generation of noise and belt slip in the early stage.

In contrast, in the V-ribbed belt B of the first embodiment, the friction coefficient reduction effect lasts for a long period of time from the initial time of running. As a result, generation of noise due to stick-slip can be continuously prevented. Further, irregularities in the surface of the V-shaped rib 15 are maintained for a long period of time from the initial time of running, and as a result, it is possible to continuously prevent the belt from slipping due to the hydroplaning phenomenon when the belt gets wet. The above problems in the conventional technique can therefore be solved. Details will be described below.

In the V-ribbed belt B of the first embodiment, in order to achieve both of reducing a friction coefficient from the initial time of running and maintaining such a state, a powder layer 17 comprised of the reduced friction coefficient powder particles 17*a*, 17*b*, 17*c* is provided on the surface of the thermoplastic resin film 16. Besides, in order that not all the reduced friction coefficient powder particles 17*a*, 17*b*, 17*c* are completely buried in only the thermoplastic resin film 16, and in order that the powder particles 17*a*, 17*b*, 17*c* are buried and firmly carried on the thermoplastic resin film 16 for a long period of time, the reduced friction coefficient powder particle P is sprayed beforehand on the molding surface of the belt forming mold 30, on which the pulley contact side is formed, thereby forming the powder layer 17' during the fabrication. Then, the belt formation body 10' comprised of the uncrosslinked rubber sheets 11',12',13' which are layered and coated with the thermoplastic resin sheet 16 is pressure welded to the powder layer 17', and the uncrosslinked rubber sheets 11',12',13' are cross-linked by applying a pressure at a molding temperature at which the reduced friction coefficient powder particle P does not melt and the thermoplastic resin sheet 16' becomes soft or melts. Since the thermoplastic resin sheet 16' is soft or melted, the reduced friction coefficient powder particle P is firmly buried in and integrated with the thermoplastic resin sheet 16'.

In the case where, like the conventional V-ribbed belt, the rubber surface before vulcanization molding is coated with thermoplastic resin, and thereafter the friction coefficient reduction filler is sprayed on the surface, the thermoplastic resin flows significantly in the course of large deformation until the thermoplastic resin is along the shape of the V-shaped rib. The flow causes the friction coefficient reduction filler adhering to the surface of the resin film to flow, and causes almost all of the friction coefficient reduction filler to be buried in the thermoplastic resin. In contrast to this, in the V-ribbed belt B of the first embodiment, the powder layer 17' is formed by spraying the reduced friction coefficient powder particle P on the molding surface of the belt forming mold 30 beforehand. Thus, the largely-deformed thermoplastic resin sheet 16', which has become soft or melted, is brought into contact with the reduced friction coefficient powder particle P right before the thermoplastic resin sheet 16' is along the shape of the V-shaped rib. As a result, the reduced friction coefficient powder particle P does not flow significantly, and the reduced friction coefficient powder particle P which is buried in the flowing thermoplastic resin sheet 16' and the reduced friction coefficient powder particle P which is remaining on the surface of the thermoplastic resin sheet 16' both exist.

Further, there is a known technique of burying powder particles beforehand in a surface of an unvulcanized rubber. However, the viscosity of the rubber during vulcanization molding is high, and therefore, powder particles cannot be buried deeply enough into the rubber to integrate with the rubber. In contrast, in the V-ribbed belt B of the first embodiment, the viscosity of the thermoplastic resin sheet 16' is significantly reduced when the thermoplastic resin sheet 16' becomes soft or melts. Thus, by combining the reduced friction coefficient powder particle P with the thermoplastic resin sheet 16', the reduced friction coefficient powder particle P can be buried deeply into the thermoplastic resin film 16. It is therefore possible to maintain a low friction coefficient for a long period of time even when the abrasion of the thermoplastic resin film 16 proceeds due to long-term running, and it is possible to obtain a multiplier effect due to the combination of the reduced friction coefficient powder particle P with the thermoplastic resin sheet 16'.

Moreover, since the powder layer 17' is formed by spraying the reduced friction coefficient powder particle P on the molding surface of the belt forming mold 30 beforehand in the V-ribbed belt B of the first embodiment, the powder layer 17 is comprised of three types of powders: first reduced friction coefficient powder particles 17a completely buried in the thermoplastic resin film 16 and integrated with the thermoplastic resin film 16; second reduced friction coefficient powder particles 17b part of which is buried in, carried on, and integrated with the surface of the thermoplastic resin film 16, and the other part of which is exposed on the surface; and third reduced friction coefficient powder particles 17c not buried in the thermoplastic resin film 16 and agglomerated and carried on the surface of the thermoplastic resin film 16, and exposed.

It is expected that, of the three types of the reduced friction coefficient powder particles, the first reduced friction coefficient powder particles 17a serve effectively to maintain the friction coefficient reduction effect for a long period of time, and that the second and third reduced friction coefficient powder particles 17b, 17c contribute to the friction coefficient reduction effect at the initial time of running, and the prevention of belt slip caused by the hydroplaning phenomenon when the belt gets wet, due to the formation of irregularities in the surface of the V-shaped rib 15.

Further, in the V-ribbed belt B of the first embodiment, even, for example, when the V-ribbed belt B is applied to a pulley to which a water-based paint that increases a friction coefficient is applied, it is possible to prevent an increase in the friction coefficient and generation of noise caused by stick-slip until the water-based paint, which is most likely to generate noise by stick-slip, comes off. This may be because the second and third reduced friction coefficient powder particles 17b, 17c remain present for a longer period of time, compared to the conventional case where powder particles are sprayed to the V-ribbed surface after vulcanization molding, and therefore in the case where the belt is applied to the pulley to which a water-based paint that increases a friction coefficient is applied, repeated friction causes the powder particles 17b, 17c to be caught, transferred, and buried in the irregularities of the soft surface of the water-based paint, thereby reducing the friction coefficient of the coated surface which has had a very high friction coefficient.

Of the first to third reduced friction coefficient powder particles 17a, 17b, 17c, the first and second reduced friction coefficient powder particles 17a, 17b are very effective in continuously reducing noise cause by stick-slip. In addition, the third reduced friction coefficient powder particles 17c are effective in obtaining the friction coefficient reduction effect by being transferred to the coating of the pulley. The third reduced friction coefficient powder particles 17c are not buried in the thermoplastic resin film 16, but are agglomerated and stuck together by the application of pressure during vulcanization molding, and therefore, unlike the conventional case where powder particles are sprayed on the V-ribbed surface after vulcanization molding, the powder particles are not easily washed away by water, and this may be the reason why the powders can be successfully transferred to the coating by the repeated friction with the pulley.

As described above, according to the V-ribbed belt B of the first embodiment, the powder layer 17 is provided on the surface of the thermoplastic resin film 16 coating the pulley contact surface of the V-ribbed belt body 10, and the powder layer 17 includes the reduced friction coefficient powder particles 17a buried in the thermoplastic resin film 16, the reduced friction coefficient powder particles 17b carried and exposed on the surface of the thermoplastic resin film 16, and the reduced friction coefficient powder particles 17c agglomerated and adhering to the reduced friction coefficient powder particles 17b carried and exposed on the surface of the thermoplastic resin film 16. It is therefore possible to effectively reduce generation of noise for a long period of time from the initial time of running even under severe conditions, e.g., under a condition in which a plurality of pulleys around which the V-ribbed belt B is wrapped include a pair of pulleys having a short belt span length of 40 to 100 mm and therefore having large misalignment of 0.5 to 2.0° (strictly 1.0 to) 2.0° between the pulleys, under a condition in which the belt is provided in a place such as an engine compartment of an automobile which may get a great amount of water, or under a condition in which a range of rotation change is significant, i.e., 30 to 50% (more strictly 50 to 80%). Further, since the reduced friction coefficient powder particles 17 provide the effect of reducing the friction coefficient, abrasion due to contact with a pulley can also be reduced. Moreover, the irregularities formed of the reduced friction coefficient powder particles 17 can prevent hydroplaning (can drain water) when the belt gets wet, and thus can prevent slipping due to the immersion in water. Further, the thermoplastic resin film 16 may increase resistance to cracks. The term "belt span length" used herein is a distance between contact points of the common tangent to a pair of adjacent pulleys around which the V-ribbed belt B is wrapped (see page 39 of Practical Design for Belt Transmission and Precise Transportation (New Edition), edited by the Society of Belt Transmission Engineers, published by Yokendo Co. Ltd.). The misalignment is defined using the method described in pages 64 and 65 of Practical Design for Belt Transmission and Precise Transportation (New Edition), edited by the Society of Belt Transmission Engineers, published by Yokendo Co. Ltd.

Second Embodiment

Figure 13A:
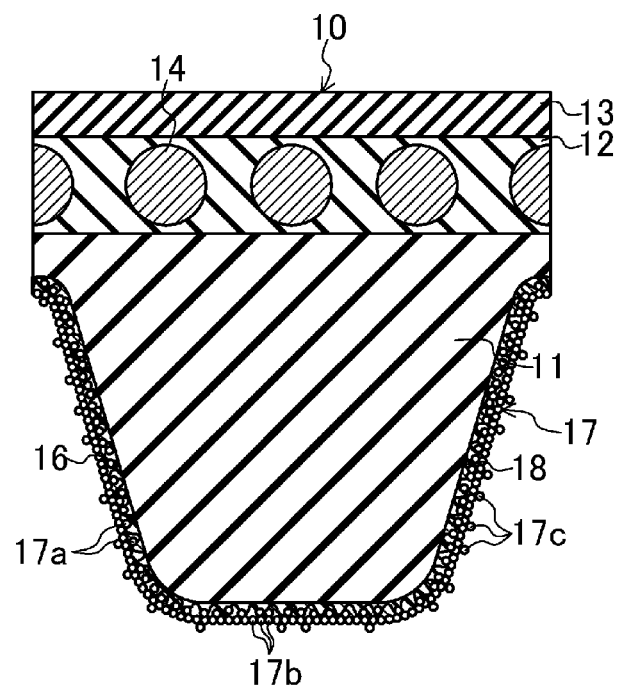
FIG. 13A is a cross-section of a main part of a V-ribbed belt of the second embodiment.
Figure 13B:
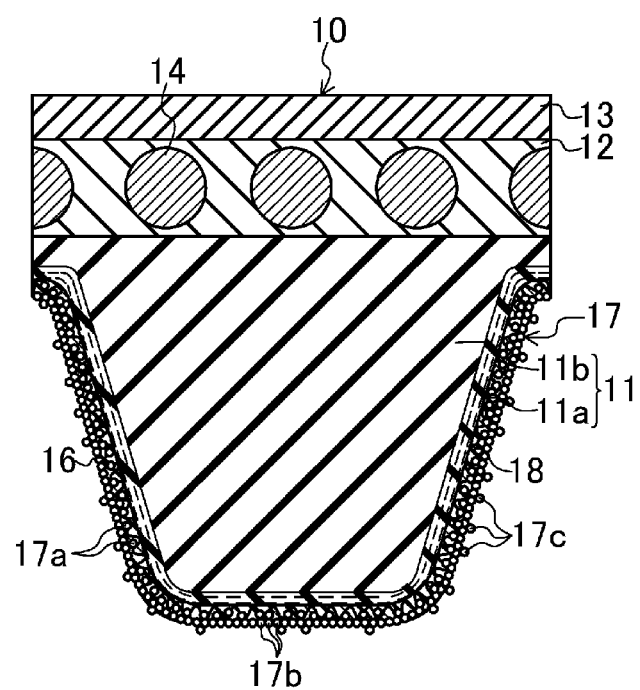
FIG. 13B is a cross-section of a main part of a variation of the second embodiment.

FIG. 13A and FIG. 13B show a V-ribbed belt B (a friction transmission belt) of the second embodiment. FIG. 13A is an example in which a compression rubber layer 11 is comprised of a single layer. FIG. 13B is an example in which the compression rubber layer 11 is comprised of two layers, i.e., a pulley contact side surface layer 11a and an inner rubber layer 11b located on the inner side of the pulley contact side surface layer 11a. Like reference characters have been used to designate the same elements as those in the first embodiment. The V-ribbed belt B of the second embodiment, as well, is used, for example, in an accessory belt transmission system provided in an engine compartment of an automobile.

In the V-ribbed belt B of the second embodiment, a cloth 18 is buried in the thermoplastic resin film 16.

The cloth 18 is made of woven fabric, knitted fabric, unwoven fabric, for example. The cloth 18 is preferably in a seamless cylindrical shape. Since the cloth 18 is shaped along the V-shaped rib 15, it is preferable that the cloth 18 has stretch properties in view of molding processability of the cloth 18. The entire cloth 18 may be buried in the middle of the thermoplastic resin film 16, or part or all of the surface of the cloth 18 may be exposed from the surface of the thermoplastic resin film 16. Further, the back side of the cloth 18 may be in close contact with a rubber underlying the thermoplastic resin film 16. The cloth 18 may be subjected to a treatment that provides adhesion between the cloth 18 and the thermoplastic resin film 16 or the rubber underlying the thermoplastic resin film 16, or may not be subjected to such an adhesion treatment. Examples of the adhesion treatment include a treatment in which the cloth 18 is immersed in a silane coupling agent solution and dried thereafter, a treatment in which the cloth 18 is immersed in an epoxy solution or an isocyanate solution and heated thereafter, a treatment in which the cloth 18 is immersed in an RFL aqueous solution and heated thereafter, and a treatment in which the cloth 18 is immersed in rubber cement and dried thereafter, or a combination of these treatments. The thickness of the cloth 18 is preferably 0.1 to 1.0 mm, and more preferably 0.3 to 1.0 mm.

Examples of a fiber material which forms the cloth 18 include synthetic fibers, such as polyethylene fibers, polypropylene fibers, polyester fibers, nylon fibers, aramid fibers, and PBO fibers, and natural fibers, such as cotton and hemp.

Now, an example method for fabricating the V-ribbed belt B of the second embodiment will be described.

Figure 14A:
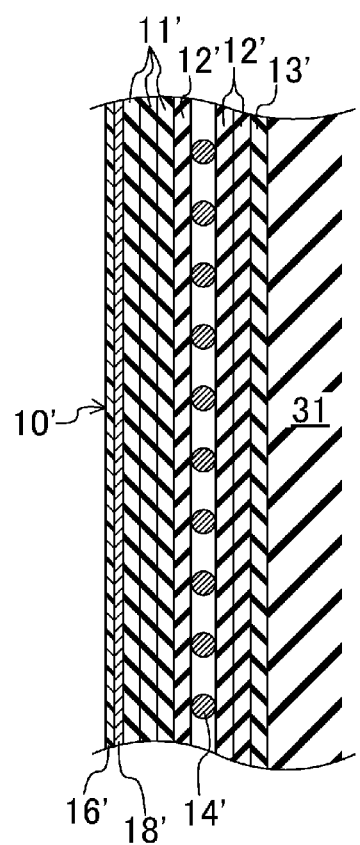
FIG. 14A and FIG. 14B are drawings for explaining a step of placing an uncrosslinked rubber sheet, etc., on an inner mold in fabricating the V-ribbed belt of the second embodiment.

In the fabrication of the V-ribbed belt B of the second embodiment, as shown in FIG. 14A, the uncrosslinked rubber sheet 13' for a backside rubber layer 13 and the uncrosslinked rubber sheet 12' for an adhesion rubber layer 12 are sequentially wrapped around and layered on the outer circumferential surface, i.e., the molding surface, of the inner mold 31. After that, the twist yarn 14' for a cord 14 is helically wrapped around the cylindrical inner mold 31, and the uncrosslinked rubber sheet 12' for the adhesion rubber layer 12 and the uncrosslinked rubber sheet 11' for a compression rubber layer 11 are sequentially wrapped around and layered on the surface. The cloth 18' is placed thereon, and lastly, a thermoplastic resin sheet 16' is wrapped around the outer surface as a coating, thereby forming a belt formation body 10'. That is, the cloth 18' intervenes between the uncrosslinked rubber composition 12' and the thermoplastic resin 16' in the belt formation body 10'. In this case, the thermoplastic resin sheet 16' on the surface side becomes soft or melts during formation of the belt, and penetrates into the cloth 18' underlying the thermoplastic resin sheet 16'. As a result, a structure in which the cloth 18 is buried in the thermoplastic resin film 16 can be obtained.

Figure 14B:
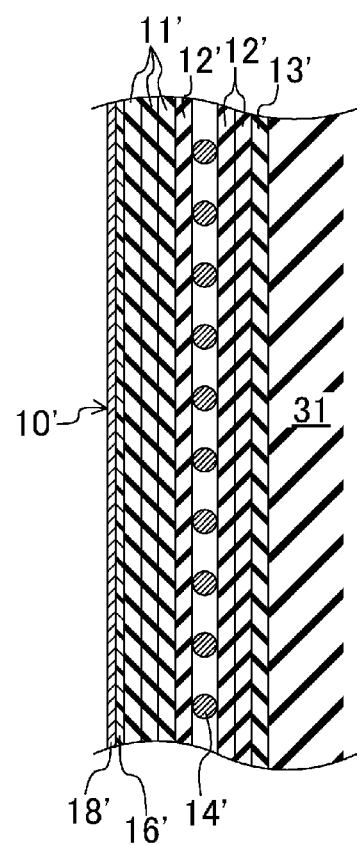

Further, in the fabrication of the V-ribbed belt B of the second embodiment, as shown in FIG. 14B, the uncrosslinked rubber sheet 13' for a backside rubber layer 13 and the uncrosslinked rubber sheet 12' for the adhesion rubber layer 12 are sequentially wrapped around and layered on the outer circumferential surface, i.e., the molding surface, of the inner mold 31. After that, the twist yarn 14' for the cord 14 is helically wrapped around the cylindrical inner mold 31, and the uncrosslinked rubber sheet 12' for the adhesion rubber layer 12 and an uncrosslinked rubber sheet 11' for the compression rubber layer 11 are sequentially wrapped around and layered on the surface. A thermoplastic resin sheet 16' is wrapped around the outer surface as a coating, and lastly the cloth 18' is placed thereon to form the belt formation body 10'. In this case, the thermoplastic resin sheet 16' underlying the cloth 18' becomes soft and melts during formation of the belt, and penetrates into the cloth 18' on the surface side. As a result, a structure in which the cloth 18 is buried in the thermoplastic resin film 16 can be obtained.

The other configurations, fabrication methods, and advantages are the same as those in the first embodiment.

Other Embodiments

In the first and second embodiments, the V-ribbed belt B is described as a friction transmission belt, but the present disclosure is not particularly limited to the V-ribbed belt B, and is also applicable to a raw edge V-belt, etc.

Although the accessory belt transmission system 20 of an automobile has been described as the belt transmission system in the first and second embodiments, the present disclosure is not particularly limited to the accessory belt transmission system 20, and is also applicable to belt transmission systems for general industrial use, etc.

EXAMPLES

V-Ribbed Belt

V-ribbed belts of Examples 1-2 and Comparative Examples 1-3 having the configurations described below were formed. Their configurations are also shown in Table 1.

Example 1

Respective uncrosslinked rubber sheets for the compression rubber layer, the adhesion rubber layer, and the backside rubber layer, each made of an EPDM composition, and twist yarn for the cord were prepared.

Specifically, the uncrosslinked rubber sheet for the pulley contact side surface layer of the compression rubber layer was produced by mixing 100 parts by mass of EPDM (made by The Dow Chemical Company, trade name: Nordel IP4640, ethylene content: 55% by mass, propylene content: 40% by mass, ethylidene norbornane (ENB): 5.0% by mass, Mooney viscosity: 40 $ML_{1+4}$ (125° C.)) as a rubber component with 50 parts by mass of carbon black (made by Showa Cabot Corp., trade name: Showblack IP200 Carbon), 8 parts by mass of paraffinic oil (made by Japan Sun Oil Company LTD., trade name: SunFlex 2280), 1.6 parts by mass of a vulcanizing agent (made by Hosoi Chemical Industry Co., Ltd., trade name: Oil Sulfur), 2.8 parts by mass of a vulcanization accelerator (made by Ouchi Shinko Chemical Industrial Co., Ltd., trade name: EP-150), 1.2 parts by mass of a vulcanization accelerator (made by Ouchi Shinko Chemical Industrial Co., Ltd., trade name: MSA), 1 part by mass of a vulcanization assistant (made by Kao Corporation, stearic acid), 5 parts by mass of a vulcanization assistant (made by Sakai Chemical Industry Co., Ltd., zinc oxide), 2 parts by mass of an antioxidant (made by Ouchi Shinko Chemical Industrial Co., Ltd., trade name: 224 (TMDQ: 2,2,4-trimethyl-1,2-dihydroquinoline)), 1 part by mass of an antioxidant (made by Ouchi Shinko Chemical Industrial Co., Ltd., trade name: MB (2-mercaptobenzimidazole)), and 40 parts by mass of ultra high molecular weight polyethylene (made by Mitsui Chemicals, Inc., trade name: Hizex Million 240S), kneading the mixture in a Banbury mixer, and then rolling the kneaded mixture by calender rolls.

The uncrosslinked rubber sheet for the inner rubber layer of the compression rubber layer was produced by mixing 100 parts by mass of EPDM (made by The Dow Chemical Company, trade name: Nordel IP4640) as a rubber component with 70 parts by mass of carbon black (made by Showa Cabot Corp., trade name: Showblack IP200 Carbon), 8 parts by mass of paraffinic oil (made by Japan Sun Oil Company LTD., trade name: SunFlex 2280), 1.6 parts by mass of a vulcanizing agent (made by Hosoi Chemical Industry Co., Ltd., trade name: Oil Sulfur), 2.8 parts by mass of a vulcanization accelerator (made by Ouchi Shinko Chemical Industrial Co., Ltd., trade name: EP-150 (a mixture of vulcanization accelerators DM (dibenzothiazyl disulfide), TT (tetramethylthiuramdisulfide), and EZ (zinc diethyldithiocarbamate)), 1.2 parts by mass of a vulcanization accelerator (made by Ouchi Shinko Chemical Industrial Co., Ltd., trade name: MSA (N-oxydiethylene-2-benzothiazolylsulfenamide), 1 part by mass of a vulcanization assistant (made by Kao Corporation, stearic acid), 5 parts by mass of a vulcanization assistant (made by Sakai Chemical Industry Co., Ltd., zinc oxide), 2 parts by mass of an antioxidant (made by Ouchi Shinko Chemical Industrial Co., Ltd., trade name: 224), and 1 part by mass of an antioxidant (made by Ouchi Shinko Chemical Industrial Co., Ltd., trade name: MB), kneading the mixture in a Banbury mixer, and then rolling the kneaded mixture by calender rolls.

The uncrosslinked rubber sheet for the adhesion rubber layer was produced by mixing 100 parts by mass of EPDM (made by The Dow Chemical Company, trade name: Nordel IP4640) as a rubber component with 50 parts by mass of carbon black (made by Mitsubishi Chemical Corporation, trade name: HAF Carbon), 20 parts by mass of silica (made by Tokuyama Corporation, trade name: TOKUSIL Gu), 20 parts by mass of paraffinic oil (made by Japan Sun Oil Company LTD., trade name: SunFlex 2280), 3 parts by mass of a vulcanizing agent (made by Hosoi Chemical Industry Co., Ltd., trade name: Oil Sulfur), 2.5 parts by mass of a vulcanization accelerator (made by Ouchi Shinko Chemical Industrial Co., Ltd., trade name: EP-150), 1 part by mass of a vulcanization assistant (made by Kao Corporation, stearic acid), 5 parts by mass of a vulcanization assistant (made by Sakai Chemical Industry Co., Ltd., zinc oxide), 2 parts by mass of an antioxidant (made by Ouchi Shinko Chemical Industrial Co., Ltd., trade name: 224), 1 part by mass of an antioxidant (made by Ouchi Shinko Chemical Industrial Co., Ltd., trade name: MB), 5 parts by mass of a tackifier (ZEON CORPORATION, trade name: Petroleum Resin Quintone A-100) and 2 parts by mass of short fibers (cotton powder), kneading the mixture in a Banbury mixer, and then rolling the kneaded mixture by calender rolls.

The uncrosslinked rubber sheet for the backside rubber layer was produced by mixing 100 parts by mass of EPDM (made by The Dow Chemical Company, trade name: Nordel IP4640) as a rubber component with 60 parts by mass of carbon black (made by Mitsubishi Chemical Corporation, trade name: HAF Carbon), 8 parts by mass of paraffinic oil (made by Japan Sun Oil Company LTD., trade name: SunFlex 2280), 1.6 parts by mass of a vulcanizing agent (made by Hosoi Chemical Industry Co., Ltd., trade name: Oil Sulfur), 2.8 parts by mass of a vulcanization accelerator (made by Ouchi Shinko Chemical Industrial Co., Ltd., trade name: EP-150), 1.2 part by mass of a vulcanization accelerator (made by Ouchi Shinko Chemical Industrial Co., Ltd., trade name: MSA), 1 part by mass of a vulcanization assistant (made by Kao Corporation, stearic acid), 5 parts by mass of a vulcanization assistant (made by Sakai Chemical Industry Co., Ltd., zinc oxide), 2 parts by mass of an antioxidant (made by Ouchi Shinko Chemical Industrial Co., Ltd., trade name: 224), 1 part by mass of an antioxidant (made by Ouchi Shinko Chemical Industrial Co., Ltd., trade name: MB), and 13 parts by mass of short fibers (made by Asahi Kasei Corporation, trade name: Nylon 66, Type T-5), kneading the mixture in a Banbury mixer, and then rolling the kneaded mixture by calender rolls.

The twist yarn for the cord was made of 1100 dtex/2×3 (the number of second twists: 9.5 T/10 cm (Z), the number of first twists: 2.19 T/10 cm (S)) of polyester fibers made by TEIJIN LIMITED. The twist yarn was sequentially subjected to a treatment of soaking the twist yarn in a toluene solution containing 20% by mass (solid content) of isocyanate, and heating and drying the twist yarn at 240° C. for 40 seconds, a treatment of soaking the twist yarn in an RFL aqueous solution, and heating and drying the twist yarn at 200° C. for 80 seconds, and a treatment of soaking the twist yarn in rubber cement produced by dissolving a rubber composition for the adhesion rubber layer in toluene, and heating and drying the twist yarn at 60° C. for 40 seconds.

The RFL aqueous solution was prepared as follows. Resorcinol, formalin (37% by mass), and sodium hydroxide were added to water, and the resultant mixture was stirred. Then, water was added to the mixture, and the resultant mixture was matured for 5 hours while stirring, thereby preparing an RF aqueous solution with the ratio of the number of moles of resorcinol (R) to the number of moles of formalin (F) being 0.5.40% by mass (solid content) of chlorosulfonated polyethylene rubber (CSM) latex (L) was added to this RF aqueous solution so that the solid mass ratio of RF to L become 0.25, and water was further added so that the solid content become 20% by mass. The resultant mixture was matured for 12 hours while stirring, whereby the RFL aqueous solution was prepared.

A rubber sleeve (an inner mold) was placed on a cylindrical drum having a smooth surface, and the uncrosslinked rubber sheet for the backside rubber layer and the uncrosslinked rubber sheet for the adhesion rubber layer were sequentially wrapped around the rubber sleeve. Then, the twist yarn having been subjected to the adhesion treatment was helically wound therearound. Further, the uncrosslinked rubber sheet for the adhesion rubber layer, the uncrosslinked rubber sheet for the inner rubber layer of the compression rubber layer, and the uncrosslinked rubber sheet for the pulley contact side surface layer of the compression rubber layer were sequentially wrapped therearound. Moreover, a knitted fabric (made of polyamide fibers) in a cylindrical shape and not subjected to an adhesion treatment was placed thereon, and lastly, a high density polyethylene sheet (made by KEIYO POLYETHYLENE CO., LTD., a resultant obtained by rolling a mixture of T4005 (trade name) and T4010 (trade name) blended at a one-to-one mass ratio into sheet with a thickness of 40 μm) was wound as a coating, thereby forming a belt formation body. In this case, the obtained V-ribbed belt will have inferior resistance to cracks if the high density polyethylene sheet is connected by a lap joint. Thus, the end portions were not adhered to each other, but connected by a butt joint.

On the other hand, fluorocarbon resin powder particles (made by KITAMURA LIMITED, trade name: KTL-10L, particle size of 10 μm) charged at 100 kV was sprayed on the inner circumferential surface of the outer mold to form a powder layer with a thickness of 50 μm.

The outer mold on which the powder layer had been formed was placed on the rubber sleeve on which the belt formation body had been set, and the outer mold was closed. Then, the outer mold was heated, and a pressure was applied to the sealed inner space of the inner mold, thereby vulcanizing and molding the belt slab. The molding temperature was 170° C. The molding pressure was 1.0 MPa. The molding time was 30 minutes. In the belt slab after the vulcanization molding, the high density polyethylene sheet had shrunk, and a gap was formed between the ends which were separated from each other.

A V-ribbed belt fabricated from this belt slab is Example 1. The V-ribbed belt of Example 1 has a length of 1115 mm, a width of 21.36 mm, and a thickness of 4.3 mm. The height of a V-shaped rib is 2.0 mm, and the number of the V-shaped ribs is 6.

Example 2

A V-ribbed belt of Example 2 was fabricated by the same method of Example 1 except that the knitted fabric was not placed.

Comparative Example 1

A V-ribbed belt of Comparative Example 1 was fabricated by the same method of Example 1 except that the fluorocarbon resin powder was not sprayed on the outer mold.

Comparative Example 2

A V-ribbed belt of Comparative Example 2 was fabricated by the same method of Example 1 except that the knitted fabric was not placed, and that the fluorocarbon resin powder was not sprayed on the outer mold.

Comparative Example 3

A V-ribbed belt of Comparative Example 3 was fabricated by the same method of Example 1 except that the high density polyethylene sheet was not wound.

Comparative Example 4

A V-ribbed belt of Comparative Example 4 was fabricated by the same method of Example 1 except that the knitted fabric was not placed, that the high density polyethylene sheet was not wound, and that the fluorocarbon resin powder was sprayed on the V-ribbed surface after vulcanization molding instead of spraying the fluorocarbon resin powder on the outer mold.

Comparative Example 5

A V-ribbed belt of Comparative Example 5 was fabricated by the same method of Example 1 except that the fluorocarbon resin powder was sprayed on the surface of the high density polyethylene sheet instead of spraying the fluorocarbon resin powder on the outer mold.

TABLE 1

| | Example | | Comparative Example | | | | |
| --- | --- | --- | --- | --- | --- | --- | --- |
| | 1 | 2 | 1 | 2 | 3 | 4 | 5 |
| Knitted Fabric Coating | ✓ | | ✓ | | ✓ | | ✓ |
| Thermoplastic Resin Sheet Coating | ✓ | ✓ | ✓ | ✓ | | | ✓ |
| Powder Sprayed on Resin Sheet | | | | | | | ✓ |
| Powder Sprayed on Forming Mold | ✓ | ✓ | | | ✓ | | |
| Powder Sprayed After Vulcanization Molding | | | | | | ✓ | |
| Time (Hours) When Misalignment Noise Was Generated | >300 | >300 | 1 | 0 | 25 | 0 | 8 |
| Rotation Change Noise Evaluation | No | No | Moderate | Large | Moderate | Large | Moderate |

(Test Evaluation Method)

The following noise tests during running were conducted on Examples 1 to 2 and Comparative Examples 1 to 5.

<Noise Test on Misalignment Belt Running>

Figure 15:
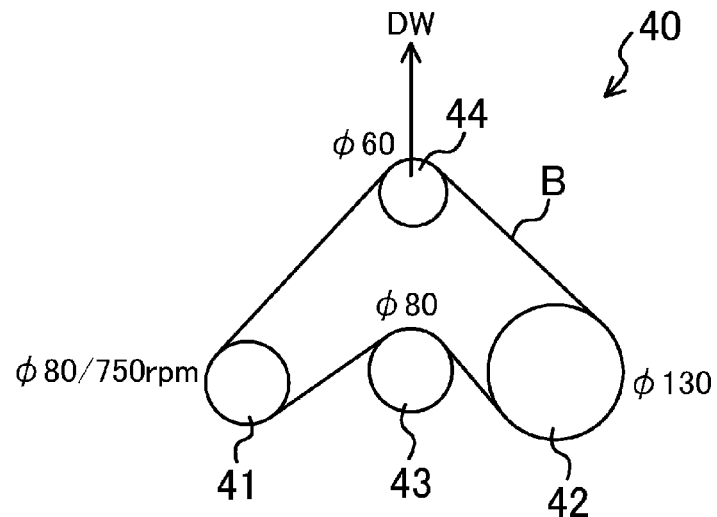
FIG. 15 shows a layout of pulleys of a belt running tester for a noise test on misalignment belt running.

FIG. 15 shows a layout of pulleys of a belt running tester 40 for a noise test on misalignment belt running.

The belt running tester 40 includes: a driving pulley 41 which is a ribbed pulley located on the lower left side and having a diameter of 80 mm; a first driven pulley 42 which is a ribbed pulley made of phenol resin, located on the right side of the driving pulley 41, and having a diameter of 130 mm; a second driven pulley 43 which is a flat pulley located between the driving pulley 41 and the first driven pulley 42 and having a diameter of 80 mm; and a third driven pulley 44 which is a ribbed pulley located above the second driven pulley 43 and having a diameter of 60 mm. In the belt running tester 40, the V-ribbed belt B is wound around the pulleys such that the V-shaped rib side of the V-ribbed belt B is in contact with the driving pulley 41, the first driven pulley 42, and the third driven pulley 44, which are ribbed pulleys, and such that the back side of the V-ribbed belt B is in contact with the second driven pulley 43, which is a flat pulley. The third driven pulley 44 is movable in upward and downward directions so that a belt tension can be applied to the V-ribbed belt B. Further, the first driven pulley 42 and the second driven pulley 43 are misaligned by 3°.

Each of the V-ribbed belts of Examples 1 to 2 and Comparative Examples 1 to 5 were set on the belt running tester 40, and a dead weight of 380 N was applied upward to the third driven pulley 44 so that a belt tension was applied to the V-ribbed belt. Then, the driving pulley 41 was rotated at a rotational speed of 750 rpm at an ambient temperature of 5° C. to cause the belt to run. The running time of the belt until a specific noise was generated was measured as noise generation running time. The test was stopped when the running time of the belt exceeded 300 hours.

<Noise Test on Rotation Change Belt Running>

Figure 16:
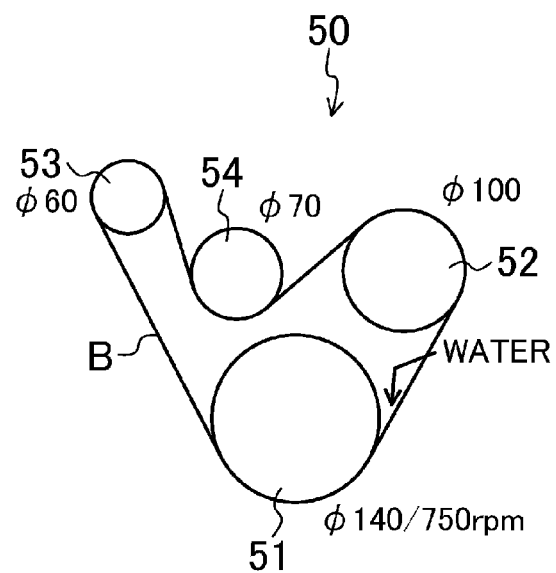
FIG. 16 shows a layout of pulleys of a belt running tester for a noise test on rotation change belt running.

FIG. 16 shows a layout of pulleys of a belt running tester 50 for a noise test on rotation change belt running.

The belt running tester 50 includes: a driving pulley 51 which is a ribbed pulley located at the bottom and having a diameter of 140 mm; a first driven pulley 52 which is a ribbed pulley located on the upper right side of the driving pulley 51 and having a diameter of 100 mm; a second driven pulley 53 which is a ribbed pulley located on the upper left side of the driving pulley 51 and the first driven pulley 52 and having a diameter of 60 mm; and an idler pulley 54 which is a flat pulley located on the left side of the first driven pulley 52 and having a diameter of 70 mm. In the belt running tester 50, the V-ribbed belt B is wound around the pulleys such that the V-shaped rib side of the V-ribbed belt B is in contact with the driving pulley 51 and the first and second driven pulleys 52, 53, which are ribbed pulleys, and such that the back side of the V-ribbed belt B is in contact with the idler pulley 54, which is a flat pulley. The driving pulley 51 is coated with an water-based paint.

Each of the V-ribbed belts of Examples 1 to 2 and Comparative Examples 1 to 5 were set on the belt running tester 50, and the idler pulley 54 was positioned so that a belt tension of 350 N was applied to the belt. Rotation load was applied to the first and second driven pulleys 52, 53, and the driving pulley 51 was rotated at a rotational speed of 750 rpm for five minutes at an ambient temperature of 25° C. to cause the belt to run, while spraying water with an atomizer on a winding start portion of the belt around the driving pulley 51, and changing the rotation of the driving pulley 51 at a 25 Hz rotation change rate of 27%. Whether noise was generated or not was checked during the running of the belt, and evaluated on a 4-point scale, that is, no noise, small noise, moderate noise, and large noise.

(Test Evaluation Result)

The test results are shown in Table 1.

The results of the noise test on misalignment belt running show that the belts of Examples 1 and 2 did not generate any noise for 300 hours. On the other hand, the belt of Comparative Example 1 generated noise one hour after the start of the running. The belts of Comparative Examples 2 and 4 generated noise immediately after the start of the running. The belt of Comparative Example 3 generated noise 25 hours after the start of the running. The belt of Comparative Example 8 generated noise 8 hours after the start of the running.

The results of the noise test on rotation change belt running show that the belts of Examples 1 and 2 did not generate any noise. On the other hand, the belts of Comparative Examples 1, 3, and 5 generated moderate noise, and the belts of Comparative Examples 2 and 4 generated large noise.

The present disclosure is useful as a friction transmission belt, a method for fabricating the friction transmission belt, and a belt transmission system.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A friction transmission belt comprising:
   a belt body made of a rubber composition adapted to wrap around pulleys to transmit power
   a thermoplastic resin film coated on a pulley contact surface of the belt body, said thermoplastic resin film comprising a first set of reduced friction coefficient powder particles buried therein; and
   a powder layer comprising a second set and a third set of reduced friction coefficient powder particles,
   wherein the second set of reduced friction coefficient powder particles are carried and exposed on the surface of the thermoplastic resin film, and
   the third set of reduced friction coefficient powder particles are agglomerated and adhered to the second set of reduced friction coefficient powder particles carried and exposed on the surface of the thermoplastic resin film.

2. The friction transmission belt of claim 1, wherein a cloth is buried in the thermoplastic resin film.

3. The friction transmission belt of claim 2, wherein the cloth is a knitted fabric.

4. The friction transmission belt of claim 1, wherein the thermoplastic resin film has a thickness of 0.1 to 200 μm.

5. The friction transmission belt of claim 1, wherein a softening temperature or a melting point of a thermoplastic resin that forms the thermoplastic resin film is 100 to 170° C.

6. The friction transmission belt of claim 1, wherein the thermoplastic resin film is made of polyethylene resin.

7. The friction transmission belt of claim 1, wherein the reduced friction coefficient powder particles forming the powder layer have a particle size of 0.1 to 150 μm.

8. The friction transmission belt of claim 1, wherein the reduced friction coefficient powder particles forming the powder layer are made of fluorocarbon resin.

9. The friction transmission belt of claim 1, wherein the belt body is a V-ribbed belt body.

10. The friction transmission belt of claim 1 comprising:
the belt body made of a rubber composition adapted to wrap around pulleys to transmit power, wherein
the powder layer formed beforehand by spraying the reduced friction coefficient powder particles on a molding surface of a belt forming mold on which the pulley contact side of the friction transmission belt is formed,
a belt formation body comprised of an uncrosslinked rubber composition coated with a thermoplastic resin which is pressure welded to the powder layer, and
the uncrosslinked rubber composition which is cross-linked at a molding temperature at which the reduced friction coefficient powder particles do not melt and at which the thermoplastic resin becomes soft or melts.

11. A belt transmission system, comprising:
the friction transmission belt of claim 10, and
a plurality of pulleys around which the belt body of the friction transmission belt is wrapped.

12. A belt transmission system, comprising:
the friction transmission belt of claim 1, and
a plurality of pulleys around which the belt body of the friction transmission belt is wrapped.

13. The belt transmission system of claim 12, wherein the plurality of pulleys include a pair of pulleys between which a belt span length of the friction transmission belt is 40 to 100 mm.

14. The belt transmission system of claim 13, wherein misalignment between the pair of pulleys is 0.5 to 2.0°.

15. A method for fabricating the friction transmission belt of claim 1 comprising:
forming the powder layer beforehand by spraying the reduced friction coefficient powder particles on a molding surface of a belt forming mold on which the pulley contact side of the friction transmission belt is formed,
coating a belt formation body comprised of an uncrosslinked rubber composition with a thermoplastic resin which is pressure welded to the powder layer, and
cross-linking the uncrosslinked rubber composition at a molding temperature at which the reduced friction coefficient powder particles do not melt and at which the thermoplastic resin becomes soft or melts.

16. The method of claim 15, further comprising intervening a cloth between the uncrosslinked rubber composition and the thermoplastic resin in the belt formation body.

17. The friction transmission belt of claim 1, wherein the powder layer has irregularities on its surface.

18. The friction transmission belt of claim 1, wherein a rubber component of the rubber composition that makes the pulley contact surface of the belt body is EPDM.

* * * * *